US009178748B2

(12) United States Patent
Curcio et al.

(10) Patent No.: US 9,178,748 B2
(45) Date of Patent: *Nov. 3, 2015

(54) TRANSMISSION OF INFORMATION RELATING TO A QUALITY OF SERVICE

(71) Applicant: MICROSOFT TECHNOLOGY LICENSING, LLC, Redmond, WA (US)

(72) Inventors: Igor Danilo Diego Curcio, Tampere (FI); Miikka Lundan, Tampere (FI); Emre Baris Aksu, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,662

(22) Filed: Feb. 15, 2013

(65) Prior Publication Data

US 2013/0159518 A1    Jun. 20, 2013

Related U.S. Application Data

(63) Continuation of application No. 13/540,161, filed on Jul. 2, 2012, now Pat. No. 8,380,848, which is a continuation of application No. 11/793,077, filed as application No. PCT/IB2004/002826 on Sep. 1, 2004, (Continued)

(51) Int. Cl.
*G06F 15/16* (2006.01)
*H04L 29/08* (2006.01)

(Continued)

(52) U.S. Cl.
CPC ...... *H04L 29/08954* (2013.01); *H04L 12/5695* (2013.01); *H04L 29/06027* (2013.01);

(Continued)

(58) Field of Classification Search
USPC ......... 709/202, 203, 205, 206, 207, 221, 222, 709/223, 232, 226, 228, 230
See application file for complete search history.

(56) References Cited

U.S. PATENT DOCUMENTS 5,799,317 A    8/1998   He et al.
5,867,494 A    2/1999   Krishnaswamy et al.
(Continued)

FOREIGN PATENT DOCUMENTS

CN    1423889 A    6/2003
EP    1193920 A2    4/2002
(Continued)

OTHER PUBLICATIONS

International Search Report and Written Opinion of the ISA for International Application No. PCT/IB2004/002826, Jan. 13, 2005, 12 pages.

(Continued)

*Primary Examiner* — Michael Y Won
(74) *Attorney, Agent, or Firm* — Judy Yee; Micky Minhas

(57) ABSTRACT

Methods of transmitting information relating to a quality of service are shown, which information is to be transmitted in at least one direction between a first device 30 and a second device 20. A first method comprises at least at one of the devices 20, 30 assembling a protocol message containing information other than the information relating to a quality of service and attaching the quality of service related information to the protocol message. A second method comprises forming the information relating to a quality of service inside at least one of a header field and an attribute of a protocol message. The disclosure relates equally to corresponding software codes, devices 20, 30, network elements and systems.

28 Claims, 4 Drawing Sheets

Related U.S. Application Data now Pat. No. 8,239,521.

(60) Provisional application No. 60/513,460, filed on Oct. 21, 2003, provisional application No. 60/499,638, filed on Sep. 2, 2003.

(51) Int. Cl.
*H04L 12/54* (2013.01)
*H04L 29/06* (2006.01)
*H04L 12/801* (2013.01)
*H04L 12/923* (2013.01)
*H04L 12/919* (2013.01)
*H04L 12/927* (2013.01)

(52) U.S. Cl.
CPC .......... *H04L29/08585* (2013.01); *H04L 47/15* (2013.01); *H04L 47/33* (2013.01); *H04L 47/762* (2013.01); *H04L 47/765* (2013.01); *H04L 47/801* (2013.01); *H04L 47/805* (2013.01); *H04L 65/607* (2013.01); *H04L 65/608* (2013.01); *H04L 65/80* (2013.01); *H04L 67/141* (2013.01); *H04L 67/322* (2013.01)

(56) References Cited

U.S. PATENT DOCUMENTS

| | | | |
|---|---|---|---|
| 5,867,495 A | 2/1999 | Elliott et al. | |
| 5,920,705 A | 7/1999 | Lyon et al. | |
| 5,958,009 A | 9/1999 | Friedrich et al. | |
| 6,405,250 B1* | 6/2002 | Lin et al. | 709/224 |
| 6,415,313 B1 | 7/2002 | Yamada et al. | |
| 6,434,134 B1 | 8/2002 | La Porta et al. | |
| 6,553,515 B1 | 4/2003 | Gross et al. | |
| 6,567,425 B1 | 5/2003 | Szabo | |
| 6,615,262 B2 | 9/2003 | Schweitzer et al. | |
| 6,654,359 B1 | 11/2003 | La Porta et al. | |
| 6,690,654 B2 | 2/2004 | Elliott et al. | |
| 6,757,732 B1* | 6/2004 | Sollee et al. | 709/227 |
| 6,839,356 B2 | 1/2005 | Barany et al. | |
| 6,839,751 B1 | 1/2005 | Dietz et al. | |
| 6,845,389 B1 | 1/2005 | Sen et al. | |
| 6,909,708 B1 | 6/2005 | Krishnaswamy et al. | |
| 6,941,551 B1* | 9/2005 | Turkoglu | 717/174 |
| 6,957,255 B1 | 10/2005 | Schweitzer et al. | |
| 6,993,784 B1 | 1/2006 | Shinotsuka | |
| 6,996,393 B2 | 2/2006 | Pyhalammi et al. | |
| 7,054,268 B1 | 5/2006 | Parantainen et al. | |
| 7,197,557 B1 | 3/2007 | Asar et al. | |
| 7,213,071 B2 | 5/2007 | DeLima et al. | |
| 7,263,095 B1* | 8/2007 | Sarkar | 370/352 |
| 7,269,423 B2 | 9/2007 | Lee et al. | |
| 7,272,651 B1 | 9/2007 | Bolding et al. | |
| 7,301,951 B2 | 11/2007 | Chen et al. | |
| 7,302,682 B2 | 11/2007 | Turkoglu | |
| 7,337,236 B2* | 2/2008 | Bess et al. | 709/240 |
| 7,394,807 B2* | 7/2008 | Hamiti et al. | 370/389 |
| 7,398,080 B2 | 7/2008 | Pyhalammi et al. | |
| 7,454,527 B2 | 11/2008 | Zhang et al. | |
| 7,490,146 B1 | 2/2009 | Motoyama et al. | |
| 7,522,578 B2 | 4/2009 | Keskiniva et al. | |
| 7,536,460 B2 | 5/2009 | Anschutz et al. | |
| 7,570,766 B2 | 8/2009 | Mangold et al. | |
| 7,599,307 B2 | 10/2009 | Seckin et al. | |
| 7,707,511 B2 | 4/2010 | Peterson | |
| 7,738,440 B2 | 6/2010 | Riley et al. | |
| 7,792,275 B2 | 9/2010 | Tai et al. | |
| 7,908,362 B2 | 3/2011 | Ferguson et al. | |
| 7,953,883 B2 | 5/2011 | Thomas et al. | |
| 7,958,242 B2 | 6/2011 | Rey | |
| 8,018,955 B2 | 9/2011 | Agarwal et al. | |
| 8,982,713 B2* | 3/2015 | Balasubramanian et al. | 370/252 |
| 2001/0049732 A1 | 12/2001 | Raciborski et al. | |
| 2002/0059432 A1 | 5/2002 | Masuda et al. | |
| 2002/0114274 A1* | 8/2002 | Sturges et al. | 370/229 |
| 2002/0119821 A1* | 8/2002 | Sen et al. | 463/42 |
| 2002/0131395 A1 | 9/2002 | Wang | |
| 2002/0131400 A1 | 9/2002 | Tinsley et al. | |
| 2002/0136167 A1 | 9/2002 | Steele et al. | |
| 2002/0152305 A1 | 10/2002 | Jackson et al. | |
| 2002/0174227 A1 | 11/2002 | Hartsell et al. | |
| 2002/0194368 A1 | 12/2002 | Kon et al. | |
| 2003/0046431 A1 | 3/2003 | Belleguie | |
| 2003/0074452 A1 | 4/2003 | Zheng et al. | |
| 2003/0236906 A1 | 12/2003 | Klemets et al. | |
| 2004/0003101 A1 | 1/2004 | Roth et al. | |
| 2004/0008689 A1 | 1/2004 | Westphal et al. | |
| 2004/0240414 A1* | 12/2004 | Fan et al. | 370/332 |
| 2005/0138130 A1* | 6/2005 | Pilkington | 709/206 |
| 2005/0198295 A1 | 9/2005 | Turkoglu | |
| 2005/0213509 A1* | 9/2005 | Collomb et al. | 370/252 |
| 2006/0218302 A1 | 9/2006 | Chia et al. | |
| 2007/0076749 A1* | 4/2007 | Anantha-Raju et al. | 370/466 |
| 2007/0265024 A1* | 11/2007 | Vincent | 455/466 |
| 2008/0215704 A1* | 9/2008 | Curcio et al. | 709/217 |
| 2008/0228912 A1 | 9/2008 | Vedantham et al. | |
| 2009/0286525 A1 | 11/2009 | Kesavan et al. | |
| 2011/0145416 A1* | 6/2011 | You | 709/226 |

FOREIGN PATENT DOCUMENTS

| | | |
|---|---|---|
| JP | 2000-295276 A | 10/2000 |
| JP | 2002077257 A | 3/2002 |
| JP | 2002135310 A | 5/2002 |
| JP | 2002217972 A | 8/2002 |
| JP | 2002-271373 A | 9/2002 |
| JP | 2002300274 A | 10/2002 |
| JP | 2002305545 A | 10/2002 |
| JP | 2003-069632 A | 3/2003 |
| JP | 2003070059 A | 3/2003 |
| JP | 2003-110558 A | 4/2003 |
| JP | 2003-522476 A | 7/2003 |
| JP | 2004527932 A | 9/2004 |
| WO | 98/23080 A2 | 5/1998 |
| WO | 99/55095 A2 | 10/1999 |
| WO | 01/35294 A1 | 5/2001 |
| WO | 01/58095 A1 | 8/2001 |
| WO | 01/63898 A2 | 8/2001 |
| WO | WO0219130 A | 3/2002 |
| WO | 02/49279 A2 | 6/2002 |

OTHER PUBLICATIONS

Andrew S. Tanenbaum: "Computer Networks" Aug. 31, 2002, Pearson Education Inc., Upper Saddle River, NJ, XP00230982, pp. 412-415.

Inria Rhone-Alpes: "RTP/RTCP and RTSP multimedia protocols for the Internet" Project Planete, 'Online! Aug. 29, 2001, XP002309891, pp. 1-26.

3GPP TS 24.228 V1.9.0 (Jan. 2002) 3rd Generation Partnership Project; Technical Specification Group Core Network; Signalling flows for the IP multimedia call control based on SIP and SDP (Release 5), XP-002241079, pp. 1-51 and 69-88.

"RTP: A Transport Protocol for Real-Time Applications" by H. Schulzrinne, et al, Jul. 2003, Network Working Group, Request for Comments: 3550, pp. 1-56.

"RTP Control Protocol Extended Reports (RTCP XR) draft-ietf-avt-rtcp-report-extns-06.txt" by Timur Friedman et al, Internet-Draft Internet Engineering Task Force AudiolVideo Transport Working-Group, May 19, 2003; pp. 1-41.

3GPP TSG-SA4 Meeting #27, Tdoc S4-030562, "Draft Rel-6 PSS Quality Metrics Permanent Document," V,0.04 for Discussion & Approval, Agenda Item 7.6.1, Munich, Germany, Jul. 7-11, 2003, pp. 1-13.

RFC 2327 "SDP: Session Desctiption Protocol," Network Working Group, Category: Standards Track,M. Handley, V. Jacobson, ISVLBNL; Apr. 1998, pp. 1-47.

RFC 3550 "RTP: A Transport Protocol for Real-Time Applications," Network Working Group, Initials Obsoletes: 1889, Category: Standards Track; H. Schulzrinne al., Jul. 2003, pp. 1-115.

(56) References Cited

OTHER PUBLICATIONS

3GPP TSG-SA4 Meeting #28, Tdoc S4-030629, "Streaming Quality Metrics—Transport," for Discussion and Agreement, Agenda Item 6.1.1, Numberg, Germany, Sep. 1-5, 2003, pp. 1-5.
3GPP TS 26.234 V5.5.0 (Jun. 2003) 3rd Generation Partnership Project, Technical Specification Group Services and System Aspects; Transparent end-to-end Packet-switched Streaming Service (PSS); Protocols and codecs (Release 5), pp. 1-85.
3GPP TSG-SA4 Meeting #26 Tdoc S4-030353, "Stream Quality Metrics—Client Metrics," for Discussion and Agreement, Agenda Item 6.7.2.2, TBD, May 5-9, 2003, pp. 1-6.
Internet Engineering Task Force, Audio/Visual Transport Working Group, "RTP Control Protocol Extended Reports (RTCP XR)", Timur Friedman, et al; May 19, 2003, pp. 1-53.
RFC 2328 "OSPF Version 2." Network Working Group, STD: 54, J. Moy, Apr. 1998, pp. 1-222.
TSG-SA WG4 #27 Meeting, Tdoc S4 (03) 0577, Report S4 #27 Plenary Meeting, V0.0.1; for Comment/Approval, Munich, Germany, Jul. 7-11, 2003; pp. 1-39.
TSG-SA4 #28 Meeting, Tdoc S4 (03) 0579, "Proposed Meeting Agenda for SA4#28," for Approval; Agenda Item 2, Eriangen, Germany, Sep. 1-5, 2003, pp. 1-2.
3GPP TSG-SA4 Meeting #28 Tdoc S-4030XXX, Streaming Quality Metrics—Transport, for Discussion and Agreement, Agenda Item XXX, Nurnberg, Germany, Sep. 1-5, 2003, pp. 1-5.
Patent Abstracts of Japan, Publication No. 2003-110558, Date of Publication: Apr. 11, 2003; one page.
Patent Abstracts of Japan, Publication No. 2000-295276, Date of Publication: Oct. 20, 2000; one page.
Patent Abstracts of Japan, Publication No. 2003-069632, Date of Publication: Mar. 7, 2003; one page.
Patent Abstracts of Japan, Publication No. 2002-271373, Date of Publication: Sep. 20, 2002; one page.
Patent Abstract of Japan, Publication No. JP2002077257, Published Mar. 15, 2003, 2 pages.
Patent Abstract of Japan, Publication No. JP2002135310, Published May 10, 2002, 2 pages.
Patent Abstract of Japan, Publication No. JP2002217972, Published Aug. 2, 2002, 2 pages.
Patent Abstract of Japan, Publication No. JP2002300274, Published Oct. 11, 2002, 2 pages.
Patent Abstract of Japan, Publication No. JP2002305545, Published Oct. 18, 2002, 2 pages.
Patent Abstract of Japan, Publication No. JP2003070059, Published Mar. 7, 2003, 2 pages.
Patent Abstract of Japan, Publication No. JP2004527932, Published Sep. 9, 2004, 2 pages.
Ishibashi, Keisuke et al., Quality and Traffic Management in the Multimedia Age, NTT Technical Journal, vol. 9, No. 11, Nov. 1, 1997, pp. 16-20 (English Abstract included).
Honda, Yoshizou et al., Video Streaming Server Load Testing and Video Service Quality Degradation Detecting Using Pseudo Clients, IPSJ SIG Notes, vol. 2002, No. 32, Mar. 29, 2002, pp. 127-132, 2002-DSP-107-22 (English Abstract included).
"Office Action and Search Report Issued in Norway Patent Application No. 20060432", Mailed Date: Sep. 4, 2014, 5 Pages.
"Office Action Issued in Norway Patent Application No. 20060432", Mailed Date: Mar. 30, 2015, 2 Pages.
"Office Action Received for Norway Patent Application No. 20060432", Mailed Date: Jul. 10, 2015, 7 Pages.

\* cited by examiner

| # | Event |
|---|---|
| 1 | Duration of a speech/audio gap (time) |
| 2 | Number of corrupted video frames (number of units) |
| 3 | Duration of video corruption (time) |
| 4 | Duration of re-buffering (time) |
| 5 | Number of packets lost in succession (number of units) |
| 6 | Detected bit-errors (number of units) |
| 7 | Corrected bit-error (number of units) |
| 8 | Stream setup time (time) |

Fig. 2

| # | Metric | Type |
|---|---|---|
| 1 | Number of gaps | Speech & Audio |
| 2 | Min gap duration | Speech & Audio |
| 3 | Max gap duration | Speech & Audio |
| 4 | Avg gap duration | Speech & Audio |
| 5 | Std of the gap duration | Speech & Audio |
| 6 | Number of frames containing potential corruption | video |
| 7 | Min corruption duration | video |
| 8 | Max corruption duration | video |
| 9 | Avg corruption duration | video |
| 10 | Std of corruption duration | video |
| 11 | Number of times player re-buffered | Player |
| 12 | Min re-buffering duration | Player |
| 13 | Max re-buffering duration | Player |
| 15 | Avg re-buffering duration | Player |
| 16 | Std of re-buffering duration | Player |
| 17 | Min number of packets lost in succession | Network |
| 18 | Max number of packets lost in succession | Network |
| 19 | Avg number of packets lost in succession | Network |
| 20 | Std of number of packets lost in succession | Network |
| 21 | Number of detected bit-errors | Network |
| 22 | Number of corrected bit-errors | Network |
| 23 | Connection terminated normally | Session |
| 24 | Stream set-up time | Session |
| 25 | Initial buffering time | Session |

Fig. 3

TRANSMISSION OF INFORMATION RELATING TO A QUALITY OF SERVICE

CROSS-REFERENCE TO RELATED APPLICATIONS

This application is a continuation of application Ser. No. 13/540,161, which is a continuation of application Ser. No. 11/793,077 which is the National Stage of International Application Number PCT/IB2004/002826 filed Sep. 1, 2004 which claims the benefit of U.S. Provisional Application Ser. No. 60/499,638 filed Sep. 2, 2003 and of U.S. Provisional Application Ser. No. 60/513,460 filed Oct. 21, 2003.

FIELD OF THE INVENTION

The invention relates to methods of transmitting information relating to a quality of service, which information is to be transmitted in at least one direction between a first device and a second device. The invention relates equally to corresponding devices, to corresponding network elements and to corresponding systems.

BACKGROUND OF THE INVENTION

One of a variety of services for which information relating to a quality of this service might have to be transmitted is a streaming class service.

For a streaming class service, a streaming server sends media data via a network to a streaming client such that the media data can be processed at the client side as a steady and continuous stream. An example for a streaming application is an Internet video product. The streaming server can also reside within the network.

Operators of the network or service providers have an interest in being able to evaluate the Quality of Service (QoS) perceived by the user of a streaming client. Currently, a streaming session as defined using the protocols standardized in 3GPP TS 26.234 offers the possibility to know a limited amount of information about the perceived end user quality. Real-Time Transport Control Protocol (RTCP) Receiver Reports are transmitted by the client to the server for reporting information on the network behavior, for instance information about packet losses, delay jitter, cumulative highest sequence number received and other information about Real-Time Transport Protocol (RTP) packets. In addition, RTCP Sender Reports are transmitted by the server to the client, which contain information about the sender.

However, these reports do not enable a streaming server, or the operator through a streaming server, to obtain any additional information about the perceived QoS from the streaming client, e.g., about the number of corrupted video frames, the duration of rebufferings, the duration of audio gaps, etc. Such information can be conveyed from a streaming client to a streaming server only by extending the current information carried by Real-time Transport Control Protocol (RTCP) reports, RTCP eXtended Reports or RTCP XR packets. Such an extension comprises a set of QoS metrics including information about session set-up and teardown, speech and audio gaps, corrupted video frames, rebuffering and initial buffering, packets lost in a succession and possible other information about session and media transmission.

The IETF RFC 2328 (RTSP specification, April 1998), the IETF RFC 3550 (RTP specification, July 2003) and the draft RTP Control Protocol Extended Reports (RTCP XR, May 2003), for example, enable a streaming client to report information on the received RTP packets, including packet loss fraction, delay jitter, highest sequence number received and sequence of packet losses.

The two documents Draft Rel-6 "PSS Quality Metrics Permanent Document", 3GPP TSG-S4 Meeting #27, Jul. 7-11 2003, Tdoc S4-030562 and in "Stream Quality Metrics—Client metrics", 3GPP TSG-S4 Meeting #26, May 5-9 2003, Tdoc S4-030353 describe additional general issues of QoS metrics in 3GPP (3rd Generation Partnership Project). The first document describes what information should be sent using 25 different parameters for speech, audio, video, player and network metrics, and what kind of protocol should be used. In addition, the second document defines high-level requirements and technical considerations. The documents define a method where the client calculates the information and sends it to the server when requested. For transport purposes, it is proposed to use a Real-Time Streaming Protocol (RTSP) GET_PARAMETER message sent from the server to the client, and an RTSP SET_PARAMETER message sent from the client to the server.

These messages are defined in more detail in the document "Streaming quality Metrics—Transport", 3GPP TSG-S4 Meeting #28, 1-5 Sep. 2003, Tdoc S4-030629. It is proposed that an RTSP SET_PARAMETER message is transmitted from the server to the client for triggering the QoS metrics. The client can respond with an RTSP 200 OK message if it accepts to send QoS metrics. The server can then send a description of the QoS metrics session with a further SET_PARAMETER message including a metrics session description METRICS-SETUP, which contains a Range, Period and Sender parameter. Also this message has to be accepted by the client with an RTSP 200 OK message. Alternatively, the server can ask the client to provide a description of the QoS metrics session with a GET_PARAMETER message. Once the QoS metrics session is described and agreed upon, either a client can send the QoS metrics with a SET_PARAMETER message, or the server can retrieve the QoS metrics with a GET_PARAMETER message.

It is a disadvantage of this approach that the three pairs of required messages cause a delay, which may slow down the session setup. The proposed approach may even mix up the setup, since the client may already be sending the first message to acquire the data from the server before receiving the second SET_PARAMETER message.

SUMMARY OF THE INVENTION

It is an object of the invention to improve the provision of a device with quality of service related information, for example the provision of a streaming server with information about the perceived end user quality of a streaming class service.

It is further an object of the invention to accelerate the setup of a session between two devices and to avoid a mix-up of the setup.

According to a first aspect of the invention, a method of transmitting information relating to a quality of service is proposed, which information is to be transmitted in at least one direction between a first device and a second device. The proposed method comprises at least at one of the devices assembling a protocol message containing information other than the information relating to a quality of service and attaching the quality of service related information to the protocol message. The proposed method further comprises transmitting the protocol message to the respective other one of the first device and the second device.

According to the first aspect of the invention, moreover a software code for transmitting information relating to a quality of service is proposed. The information is to be transmitted in at least one direction between a first device and a second device. When running in a processing component of at least at one of the devices, the software code assembles a protocol message containing information other than the information relating to a quality of service, and attaches the information relating to a quality of service to the protocol message.

According to the first aspect of the invention, moreover a device is proposed, which comprises an assembling component for assembling a protocol message containing information other than information relating to a quality of service, and for attaching information relating to a quality of service to the message, which quality of service information is to be transmitted to another device. The proposed device further comprises a transmitting component for transmitting a protocol message assembled by the assembling component to the other device. Equally, a network element of a network is proposed, which comprises corresponding features for transmitting quality of service information to a device accessing this network.

According to the first aspect of the invention, moreover a device is provided for transmitting information relating to a quality of service, which information is to be transmitted in at least one direction between a first device and a second device, at least at one of said devices comprising means for assembling a protocol message containing information other than said information relating to a quality of service, means for attaching said quality of service related information to said protocol message, and means for transmitting said protocol message to the respective other one of said first device and said second device.

According to the first aspect of the invention, moreover a device is provided for transmitting information relating to a quality of service, which information is to be transmitted in at least one direction between a first device and a second device, said device comprising means for forming said information relating to a quality of service inside at least one of a header field and an attribute of a protocol message, and means for transmitting said protocol message to the respective other one of said first device and said second device. According to the first aspect of the invention, moreover, a system is proposed, which comprises at least two devices. The first device corresponds to the above proposed device. The second device comprises a receiving unit for receiving a protocol message transmitted by the first device and a detaching component for detaching quality of service related information from a received protocol message.

The first aspect of the invention is based on the consideration that at least part of the information related to a QoS can be attached to protocol messages which are transmitted anyhow between two devices.

As a result, the number of messages is reduced, since dedicated message pairs for QoS related information are avoided.

Compared to known approaches using dedicated messages for transmitting QoS related information, it is thus an advantage of the invention that it requires less signaling overhead, that the data exchange is accelerated, that it enables a faster setup of a session, and that it enables in an easy way to exchange a larger amount of QoS related information. Such a larger amount of QoS related information may be used, for instance, for negotiating to be considered QoS data, for transmitting considered QoS data more than once, for changing to be considered QoS data during an ongoing session or for stopping a transmission of QoS data during a session. If the QoS related information is included in setup messages, also a mix-up during the setup can be avoided. It is to be understood that assembling the protocol message and attaching the QoS related information to this message can, but does not have to be realized in separate, subsequent steps. The attaching may also form part of the assembly of the protocol message. The QoS related information can further be attached at any location of a protocol message, for example in a header field of the protocol message or as an attribute to the body of the protocol message.

According to a second aspect of the invention, a further method of transmitting information relating to a quality of service, which information is to be transmitted in at least one direction between a first device and a second device, is proposed. The further proposed method comprises at least at one of the devices forming the information relating to a quality of service inside a header field or an attribute of a protocol message, and transmitting the protocol message to the respective other one of the first device and the second device.

According to the second aspect of the invention, moreover a software code for transmitting information relating to a quality of service is proposed. The information is to be transmitted in at least one direction between a first device and a second device. When running in a processing component of at least at one of the devices, the software code forms the information relating to a quality of service inside at least one of a header field and an attribute of a protocol message.

According to the second aspect of the invention, moreover a device is proposed which comprises an assembling component for forming an information relating to a quality of service inside at least one of a header field and an attribute of a protocol message, which quality of service information is to be transmitted to another device, and a transmitting component for transmitting a protocol message provided by the assembling component to this other device. Equally, a network element of a network is proposed, which comprises corresponding features for transmitting quality of service information to a device accessing this network.

According to the second aspect of the invention, moreover a device is provided comprising means for assembling a protocol message containing information other than information relating to a quality of service, and for attaching information relating to a quality of service to said message, which quality of service information is to be transmitted to another device, and means for transmitting a protocol message assembled by said assembling component to said other device.

According to the second aspect of the invention, moreover a device is provided comprising means for forming an information relating to a quality of service inside at least one of a header field and an attribute of a protocol message, which quality of service information is to be transmitted to another device, and means for transmitting a protocol message provided by said assembling component to said other device. According to the second aspect of the invention, moreover a system is proposed which comprises at least two devices. The first device corresponds to the device proposed for the second aspect of the invention. The second device comprises a receiving unit for receiving a protocol message transmitted by the first device and a detaching component for extracting quality of service related information from a received protocol message.

The second aspect of the invention is based on the recognition that using a header or an attribute of a protocol message for transmitting QoS related information is of particular advantage, because in this case, a single control module can be used to analyze the protocol messages and extract information, including QoS related information, and then to provide extracted information to the necessary modules in the system.

The second aspect of the invention may thus be based for example on a newly defined RTSP header field which is to be used for transmitting the QoS related information during a streaming class session setup or during a streaming class data transmission.

Alternatives to using a new RTSP header or attribute are using a new RTSP message definition for signaling QoS metrics, using Content-Length field and inserting a message body at the end of an RTSP message, or defining a parameter set related to QoS metrics for use with SET_PARAMETER and GET_PARAMETER RTSP messages. An implementor may choose not to use an RTSP header field for QoS metrics in order to separate the QoS metrics signaling totally from the session level signaling.

It is to be understood that both aspects of the invention can also be combined in a single implementation.

The protocol message can be in both aspects of the invention in particular, though not exclusively, an RTSP message, an RTCP message, a session initiation protocol (SIP) message or a session description protocol (SDP) description. It is a specific advantage of using RTSP messages in the proposed methods that this protocol provides flexible transmissions which are more reliable than RTCP transmissions.

The service to which the quality of service relates can be in both aspects of the invention for example, though not exclusively, a streaming class service. RTSP and RTCP may be used in particular for such a streaming class service. Accordingly, the proposed devices can be for example a receiving unit or a transmitting unit for a streaming class service, that is, a streaming client or a streaming server. The invention provides particularly well suited ways for allowing a streaming server to find out how a streaming client actually receives data and to have more information about the quality of the user experience (QoE—Quality of Experience) as well as about the problems a streaming session may encounter.

Other services may be for example Voice over IP, video telephony, or unidirectional conversational video. The conferencing protocol SIP may be used in particular for such other services.

The transmission of the protocol message can be carried out for example while forming a session and/or during an ongoing session for the respective service.

The QoS related information in a respective protocol message may comprise for instance a report on the achieved QoS for a current service. This report may include in particular parameters and/or raw data provided by one device to the other. The raw data may include, for example, notifications about events or measurement data, while the parameters, which are also referred to as metrics, are processed raw data. Further, the QoS related information may comprise a request from a first device to a second device to provide such information on the achieved QoS for a current service and/or data defining the information on the achieved QoS which is to be provided. Such data may also form part of a negotiation between the devices on the extent and frequency of information on the achieved QoS which is to be provided in a respective report.

In an advantageous embodiment, e.g. for a streaming class service, QoS related information is included in a Session Description Protocol (SDP) message or in a header field in an RTSP DESCRIPTION reply message 200 OK, in an RTSP SETUP message, in an RTSP PLAY message, in an RTSP PAUSE message or in an RTSP TEARDOWN message. Preferably, a "QoS metrics parameters setup" message is attached to an SDP message inside the reply to an RTSP DESCRIPTION message. Further preferably, a "QoS metrics parameters change" message is attached to any RTSP message like PAUSE, initiated either by the client device or by a user of the client device. It has to be noted that SDP cannot be used during a session.

In order to define QoS reporting, e.g. for a streaming class service, a set of minimal requirements should be defined. In the following, properties of the QoS reporting are defined, which are suited for maximizing their usefulness and power for a streaming service. It shall be understood that corresponding properties are of advantage for other types of services as well.

It is of advantage, if the QoS reporting can be negotiated at the beginning of a streaming and during an ongoing session. It is further of advantage, if the QoS reporting is always requested by the streaming server. It is further of advantage, if there is a possibility of grouping a set of metrics together in a single message. The server could request the client by means of a single message to report a single item of raw data or a single parameter or multiple items of raw data and/or parameters. It is further of advantage, if there is further a possibility to negotiate the reporting at session or media level as a property of granularity, e.g. to minimize the information sent over the air interface and to selectively choose what to report and from which media. It is further of advantage, if there is a possibility to switch ON/OFF the reporting. It is further of advantage, if there is a possibility to define the frequency of reporting.

The frequency of reporting can be periodic, event-driven or at the end of a session. In case of a periodic reporting, the period is requested by the streaming server, and agreed upon by the streaming client. The streaming client answers with the agreed values, which might be less optimal than those requested by the server. In case of an event-driven reporting, "bad quality" events are reported by the streaming client. This minimizes the amount of information transmitted from the streaming client to the streaming server. A reporting at the end of the session might cause problems, if the session ends abnormally. If the service is in a Pause state, the client may not send QoS related feedback data in order to avoid wasting radio resources with dummy data. The server should be able to handle such an interruption.

Preferably, the QoS metrics are computed at the server. That is, the streaming client reports a set of events and/or measurements, and the server carries out the computations, for instance determining the minimum, average and/or maximum of some values over a specified time window. The streaming server can defer the actual statistics computation to the end of the session, or to moments of low workload. Alternatively, the metrics could be computed at the client. In this case, the complexity at the client should be minimal.

It should moreover be taken care that different servers compute the QoS metrics in the same way, in order to ensure objectiveness.

As layer 3 and 4 (L3-L4) metrics are available through ordinary RTCP reports or RTCP XR reports, the invention is particularly suited for transmitting layer 5 (L5) metrics and raw data. The client should be able to buffer a number of QoS reports, and send them in a single report adding a time range specification, in order to minimize the number of messages sent over the air interface. Examples of information sent are the Session ID, the duration between corruptions, a timestamp, etc.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 2 is a table presenting events and measurements that can be detected by a client of the system of FIG. 1;
FIG. 3 is a table presenting an example of metrics that can be computed by a client of the system of FIG. 1.

DETAILED DESCRIPTION OF THE INVENTION

Figure 1:
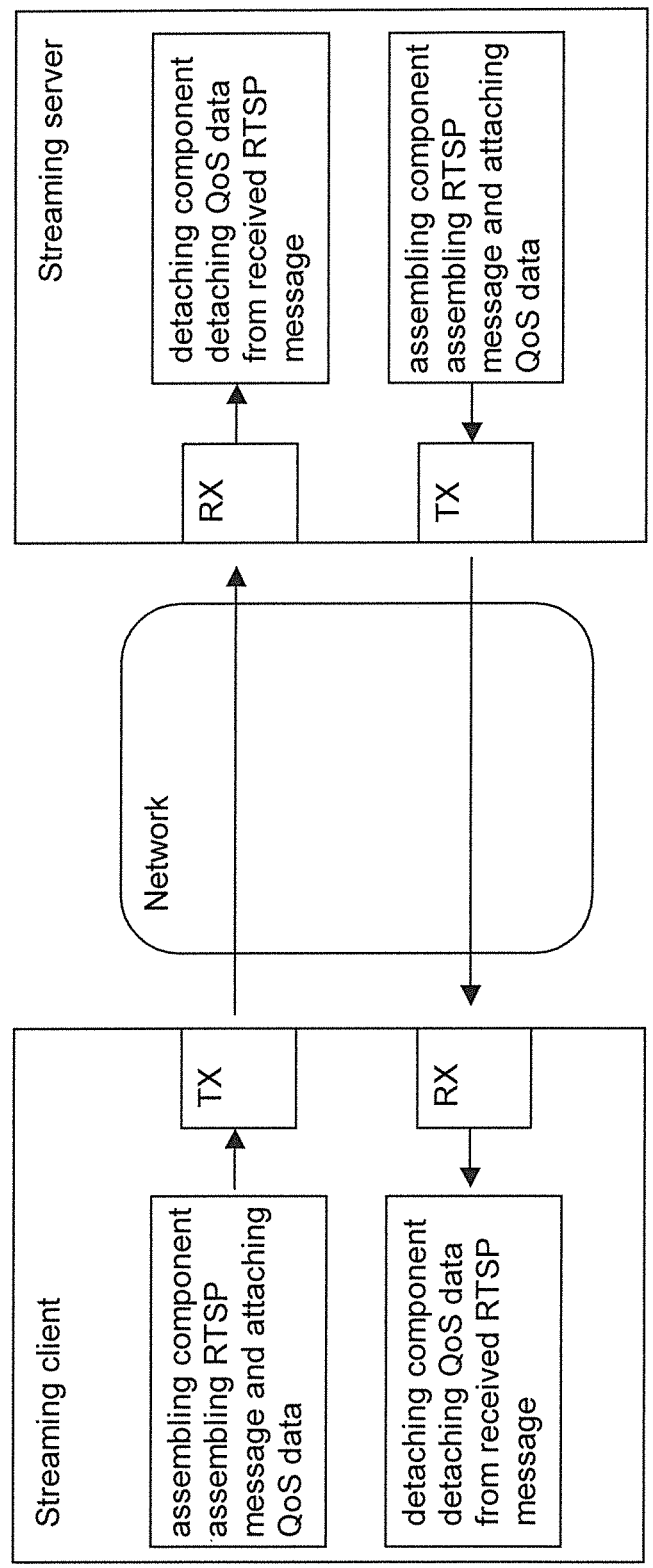
FIG. 1 schematically shows a system in which the invention can be implemented.

FIG. 1 schematically presents a system 10 in which the invention can be employed.
The system 10 comprises a streaming server 20 providing by way of example video streaming on-demand. The system 10 further comprises a streaming client 30, which may be implemented for example in a mobile phone. The streaming client 30 is connected via a network 40 to the streaming server 20, and may demand and receive a video streaming application from the streaming server 20. The network 40 may comprise for example connected to each other a Public Land Mobile Network (PLMN), which the mobile phone with the streaming client 30 may access, and the Internet, to which the streaming server 20 may be attached. It is to be understood that the streaming client 30 could also be part of a network element of the network 40.
The streaming server 20 includes an assembling component 21 for assembling RTSP messages connected to a transmitter TX 22, and a detaching component 23 for detaching QoS data connected to a receiver RX 24. The streaming client 30 equally includes an assembling component 31 for assembling RTSP messages connected to a transmitter TX 32, and a detaching component 33 for detaching QoS data connected to a receiver RX 34. Components 21, 23, 31 and 33 can be realized in particular by software, but equally by hardware.
The streaming client 30 is enabled to provide three types of QoS related values for transmission to a streaming server, namely events, measurements and metrics. Events are defined as incidents or errors in the streaming client 30 that provoke anomalies and differences from a hypothetical reference error free fruition of the medium, and may comprise for instance the duration of a speech gap. Measurements are defined as a tracking system to monitor a streaming session in normal or abnormal conditions, and may comprise for instance the session setup time. Metrics are calculations based on events and measurements, and may comprise for instance the average and/or maximum duration of a speech gap.
In the system 10 of FIG. 1, a method is implemented, which can handle a transmission of events, measurements and metrics from the streaming client 30 to the streaming server 20. More specifically, all QoS related data in either direction between the streaming client 30 and the streaming server 20, including as well events, measurements and metrics as QoS related definition and negotiation data, are attached for transmission by the assembling component 21, 31, respectively, to an RTSP messages assembled anyhow for some other purpose. The supplemented RTSP message is then transmitted by the transmitter 22, 32 of the respective transmitting unit 20, 30 via the network 40 to the receiver 34, 24 of the respective receiving unit 30, 20. In the respective receiving unit 30, 20, the QoS data is detached for further use from the received RTSP message in the respective detaching component for detaching QoS data 33, 23.

If events or measurements are transmitted by the streaming client 30, then the streaming client only detects the events and/or measurements and reports them to the streaming server 20. The streaming server 20 then carries out the calculation of the metrics. If the metrics are determined and transmitted by the streaming client 30, the streaming server 20 receives pre-calculated metrics. If the streaming client 30 calculates the metrics, more processing power is required at the mobile phone, and the data which has to be transmitted is more extensive, since several metrics can be calculated out of one event or measurement.

Examples of events and measurements that can be detected by the streaming client 30 are presented in the table of FIG. 2, while examples of metrics that can be computed by a streaming client 30 or by the streaming server 20 are presented in the table of FIG. 3. It is to be understood that the list of events, measurements and metrics employed in the system 10 may differ from the presented ones.

Moreover, four ways to define the frequency for transmission of feedback messages from the streaming client 30 to the streaming server 20 comprising events, measurements and/or metrics are provided.

In a first, periodic alternative, the feedback messages are sent during a session according to a certain schedule. This provides the possibility of a server action to adjust the QoS of the transmitted media stream(s), if required. Depending on the frequency defined, this may cause some extra traffic in the uplink direction if the period of reporting is too short. In a second, event based alternative, the feedback messages are sent based on the occurrence of events in the client 30. This method also provides possibilities for server 20 to take an action during the session, if required. If the event rate is high, too much extra traffic may be caused in the uplink direction, unless many events are appended in to the same message. In a third alternative, a feedback message is sent only once at the end of the session. This method is very bandwidth efficient, but the reported events may not be relevant anymore at the end of the session. In a fourth alternative, a feedback message with the events, measurements or metrics of the previous session is sent at the beginning of the next session. This method has the disadvantage that the reported events may be several days old, depending on how often the user is using the service, and not be relevant anymore.

Figure 4:
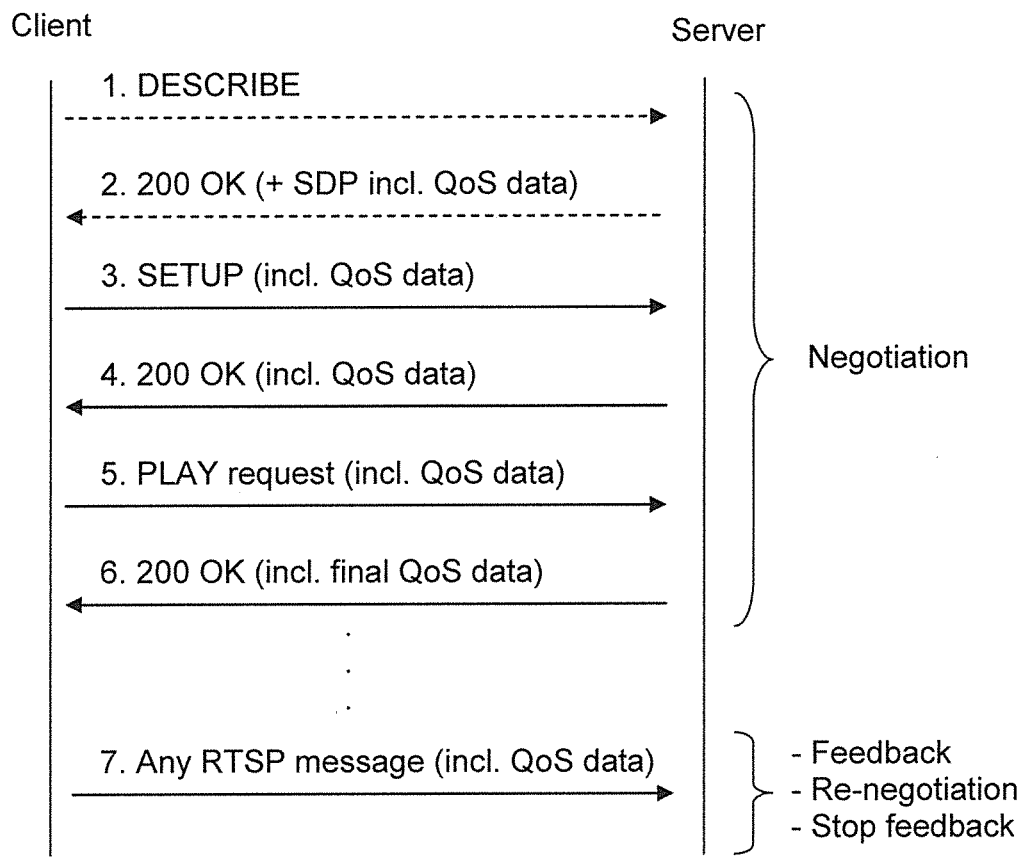
FIG. 4 is a schematic signaling diagram illustrating an embodiment of the method according to the invention.

In the system of FIG. 1, the transmission of QoS related data is realized mainly in two stages, a negotiation stage during a connection setup of a streaming session and a feedback stage during an ongoing streaming session. Both stages will be described in the following with reference to FIG. 4. FIG. 4 is a schematic signaling diagram presenting a signaling between the streaming server 20 and the streaming client 30. In addition, re-negotiation stages are enabled during the ongoing streaming session.

In an RTSP connection setup for a streaming session, the streaming client 30 and the streaming server 20 negotiate what metrics, measurements and events are sent and how often. For the negotiation, the following new QoS-Metrics header is defined, which is different from a header defined in the above mentioned document on the TSG-SA4 Meeting #28:

QoS-header="QoS-Metrics" ":" "Off"|1#(stream-url
";" Metrics ";" Sending-rate [";" Range]) CRLF
stream-url="url" "=" rtsp_URL
Metrics="metrics" "=" "{" 1#(1*TEXT) "}"
Sending-rate="rate" "=" 1*DIGIT|"End"
Range=as defined in RFC 2327
DIGIT=as defined in RFC 2326
Rtsp_URL=as defined in RFC 2326

This header can be part of any RTSP message transmitted by the streaming server 20 or the streaming client 30.

There are two ways to use the defined QoS-Metrics. If only the Off parameter is used, this is an indication that either the server 20 or the client 30 wants to cancel the transmission of events, measurements and metrics. If, on the other hand, the header contains other parameters, i.e. a stream-url, Metrics, a Sending-rate and possibly a Range, then the metrics transmission is requested to start or to restart, respectively.

The stream-url field is an RTSP session url or an RTSP media control url identifier. If the header is used with the RTSP Session Control url information, then the QoS-Metrics is used at the session level. If the url is an RTSP Media Control url, then the QoS-Metrics is used at the media level and each media gets its own QoS-Metrics line. It is possible that the same url is referenced more than once. If the Sending-Rate and Range information are different than the previously defined one, then the new metrics parameters are considered as a different parameter set, which is valid for that particular url, but for different metrics. Otherwise, the same RTSP control url must not be referenced more than once for the same Sending-Rate and Range values.

The Metrics field is used to limit the amount of metrics, measurements and events to be reported. It contains the list of names that describes the metrics, measurements and events required to be reported in a session. The names that are not included in the Metrics field are not used in the session.

The Sending-rate field is used to set the sending rate. If the Sending-rate value is 0, then the client 30 can send feedback messages at any time depending on the events occurring in the client 30. Values larger than 1 indicate a precise message-sending interval in seconds. The shortest interval is once a second and the longest interval is undefined. The feedback sending interval can be different for different media, but it is recommended to keep a sort of synchronization to avoid extra traffic. The value End indicates that only one feedback message is sent at the end of the session.

The Range field can be used to define the time limit of feedback sending. This is similar to the sending of the parameter Off, but it allows beforehand to decide the time range of an On state during the negotiation phase.

The defined QoS-Metrics field can handle the situation in which the metrics calculations are carried out in the streaming server 20 and in which the streaming client 30 sends only events and/or measurements to the server, and equally the situation in which the streaming client 30 sends pre-calculated metrics to the streaming server 20.

In addition, a new Qos-Metrics SDP attribute is defined, which can be used either as a session or as a media level SDP attribute. The definition syntax is based on RFC 2327, which is incorporated by reference herein:

a=QoS-Metrics: Metrics ";" Sending-rate [";" Range]) CRLF
Metrics="metrics" "=" "{" 1#(1*TEXT) "}"
Sending-rate="rate" "=" 1*DIGIT|"End"
Range=as defined in RFC 2327
DIGIT=as defined in RFC 2327

For opening a streaming session, the streaming client 30 transmits an RTSP DESCRIBE request as message 1 of FIG. 4 to the streaming server 20:

---

C->S    DESCRIBE rtsp://example.com/foo/bar/baz.3gp RTSP/1.0
        Cseq: 1

---

The representation C→S indicates a transmission from the client 30 to the server 20.

The actual negotiation of the QoS-Metrics field can then be started with the first DESCRIBE response as follows.

Having received the DESCRIBE request 1 from the client 30, the server 20 lists the desired QoS metrics information in the SDP description, using the QoS-Metrics SDP attribute. These metrics can be defined either at session level or at media level in the SDP. This gives flexibility to the QoS process, so that important media components can be monitored in more detail. The streaming server 20 attaches the SDP description to a DESCRIBE response 200 OK and transmits the response as message 2 of FIG. 4 to the streaming client 30. It is also possible that the server lists the QoS metrics in the DESCRIBE response message using the QoS-Metrics header, rather than using the SDP attribute. The streaming client 30 should check the existence of such a header in the response.

It has to be noted that in the above mentioned document on the TSG-S4 Meeting #28, already four dedicated QoS messages are required up to this point.

In the following, an example of a corresponding session level message is presented, where the requested session parameters are RTSPSetupTime and InitialBufferingTime, where the requested video parameters are Framegap_max and Framegap_ave and where the requested audio parameters are AudioGap_ave and AudioGap_max. It is to be noted that the names of the parameters are just examples and that a respective name may indicate metrics, measurements and/or events.

---

S->C   RTSP/1.0 200 OK
       Cseq: 1
       Content-Type: application/sdp
       Content-Base: rtsp://example.com/foo/bar/baz.3gp/
       Content-Length: 800
       Server: Nokia RTSP Server
       v=0
       0=- 3268077682 433392265 IN IP4 63.108.142.6
       s=QoS Enables Session Description Example
       e=support@nokia.com
       c=IN IP4 0.0.0.0
       t=0 0
       a=range:npt=0-83.660000
       a=QoS-Metrics:{RTSPSetupTime, InitialBufferingTime};rate=End
       a=control:*
       m=video 0 RTP/AVP 96
       b=AS:28
       a=QoS-Metrics:{Framegap_max,
       Framegap_ave};rate=15;range:npt=0-40
       a=control:trackID=3
       a=rtpmap:96 MP4V-ES/1000
       a=range:npt=0-83.666000
       a=fmtp:96profile-level-
       id=8;config=000001b008000001b509000001000000120008440fa28
       302090a28f
       m=audio 0 RTP/AVP 98
       b=AS:13
       a=QoS-Metrics:{AudioGap_ave, AudioGap_max};rate=20
       a=control:trackID=5
       a=rtpmap:98 AMR/8000
       a=range:npt=0-83.660000

```
a=fmtp:98 octet-align=1
a=maxptime:200
```

The representation S→C indicates a transmission from the server 20 to the client 30.

The QoS negotiation can be carried out at any phase during the session, if one party would like to enable QoS metrics signaling. In the example listed here, it is done at the session setup phase, using the SDP attribute. It is also possible to send the QoS metrics in any other RTSP message, using the QoS-Metrics SDP attribute or the QoS-Metrics header field according to the invention.

The streaming client 30 selects the acceptable QoS metrics listed in the SDP attribute of the received 200 OK message, or it suggests new values in a first SETUP request. If the client 30 supports QoS metrics, then it MUST send a SETUP request or some other RTSP message containing the selected/modified QoS Metrics for either session level, or for the media level, which is being set-up. Such a SETUP request message is indicated in FIG. 4 as message 3. An alternative RTSP message would be for instance the PLAY request, indicated in FIG. 4 as message 5. A corresponding, exemplary SETUP message is presented in the following:

```
C->S    SETUP rtsp://example.com/foo/bar/baz.3gp/trackID=3 RTSP/1.0
        Cseq: 2
        QoS-Metrics:url="rtsp://example.com/foo/bar/baz.3gp/track
        ID=3";
        metrics={Framegap_max, Framegap_ave};rate=10;range:npt=0-40,
        url="rtsp://example.com/foo/bar/baz.3gp";
        metrics={RTSPSetupTime, InitialBufferingTime};rate=End
```

In the above SETUP request example, the streaming client 30 modifies the sending rate of QoS metrics for the control URL "rtsp://example.com/foo/bar/baz.3gp/trackID=3" from 15 to 10.

In order to indicate that both session level and media level QoS Metrics are supported, the streaming client 30 MUST send all the supported and/or modified QoS Metrics related to the media level. It MUST also send the selected session level Qos Metrics in at least one of the SETUP requests.

The streaming server 20 receives this SETUP request and returns back a 200 OK message with the accepted QoS Metrics transmitted by the client 30 attached to re-acknowledge the changes. This 200 OK message is indicated in FIG. 4 as message 4. The streaming server 20 may also reject the changes made by the streaming client 30 in the 200 OK message. For rejecting the changes, the streaming server 20 can either set new values and resend the modified metrics back to the streaming client 30 attached to the 200 OK message, or it can simply ignore that metrics and not re-acknowledge them.

Assuming that the streaming server 20 acknowledged the changes, it may send back the following exemplary SETUP response:

```
S->C    RTSP/1.0 200 OK
        Cseq: 2
        Session: 17903320
        Transport: RTP/AVP;unicast;client_port=7000-
        7001;server_port=6970-6971
        QoS-Metrics:url="rtsp://example.com/foo/bar/baz.3gp/trackID=3";
        metrics={Framegap_max, Framegap_ave};rate=10;range:npt=0-40,
        url="rtsp://example.com/foo/bar/baz.3gp";
        metrics={RTSPSetupTime, InitialBufferingTime};rate=End
```

As the streaming client 30 receives this 200 OK message 4 in response to its SETUP request 3, it understands that the streaming server 20 supports QoS Metrics. Further, the client 30 understands that the server 20 accepted to support the listed metrics in the QoS-Metrics RTSP header.

The same signaling is carried out for the other media components in the session. The session level QoS Metrics negotiation may not be repeated in such a case.

If the streaming server 20 does not approve the modifications done by the streaming client 30, the server 20 and the client 30 may continue to re-negotiate, until an RTSP PLAY request by the client 30, indicated in FIG. 4 as message 5. The subsequent RTSP PLAY response of the server 20, indicated in FIG. 4 as message 6, then returns the final negotiated QoS-Metrics including all session and media level QoS Metrics values.

It has to be noted that each time a QoS-Metrics header field is sent in an RTSP request, it MUST also be present in the response corresponding to that particular request. Otherwise, the receiver 20, 30 of the response assumes that the respective other end 30, 20 does NOT support QoS Metrics.

It has further to be noted that the streaming client 30 might already possess the SDP description before it starts the session, for example in form of a file. If the SDP description is retrieved by other means than the DESCRIBE response from the particular server 20, the first message received by the streaming server is the SETUP message 3 of FIG. 4. The arrows associated to the DESCRIBE request message 1 and the DESCRIBE response message 2 in FIG. 4 are presented therefore only with dashed lines. The streaming client 30 may transmit in this case initial QoS Metrics information for negotiation in the SETUP message 3. If the SETUP message 3 includes QoS Metrics information, the streaming server 20 can accept the metrics or suggest new ones in the SETUP response 4, and the QoS Metrics negotiation may continue in the next RTSP messages as described above. If the first SETUP message 3 does not include the QoS Metrics information and the streaming server 20 wants to negotiate the QoS metrics with the streaming client 30, the streaming server 20 can request a reporting of QoS metrics information from the streaming client 30 by using the SETUP response 4. If the streaming client 30 accepts the requested QoS Metrics or wants to change them, the streaming client 30 must include the metrics information in the next RTSP message. If there is no QoS Metrics information in the next RTSP message, then this indicates that the streaming client 30 does not support QoS Metrics.

After the negotiation has been completed, the streaming client 30 can start sending feedback messages.

Also the feedback messages should be sent using a reliable transport mechanism. It is possible to use to this end any RTSP request-response pair employed during the streaming session. For instance, if an RTSP PAUSE message is sent anyway during the session, a feedback message can be included into this PAUSE message. If a feedback message is to be sent only at the end of the session, it is possible to use an RTSP TEARDOWN message to avoid unnecessary traffic. Such a TEARDOWN message is used anyway to send the very last feedback message, also in case of periodic feedback reporting.

For the feedback, a new header is defined as well. The following header can handle sending methods related to events, measurements or metrics. The definition syntax is based on RFC 2326, which is equally incorporated by reference herein:

Feedbackheader="QoS-Feedback" ":" 1#(stream-url 1*(parameters) CRLF)
stream-url="url" "=" rtsp_URL
parameters=";" Metrics "=" "{" SP/1#(Value [SP Timestamp]) "}"
Metrics=*TEXT
Value=1*DIGIT ["."*DIGIT]
Timestamp=1*DIGIT
DIGIT=as defined in RFC 2326
Rtsp_URL=as defined in RFC 2326
SP=as defined in RFC 2326

The Stream-url is the RTSP session url or the media control url identifier for the feedback parameter. The Metrics field in the Parameters definition contains the name of the metrics, measurements or events, and it must be the same as the Metrics field in the negotiation field QoS-Metrics. It is recommended to keep the order of metrics the same to simplify parsing. The Value field indicates the results of the Metrics. The optional Timestamp field indicates the time when the event or the measurement occurred, or when the metric was calculated. The header allows reporting zero events as well by including space (SP).

If events and measurements are used in metrics sending, there is a possibility that same event occurs more than once during a sending period. In that case the Metrics types, i.e. the name of the events or measurements, can occur more than once, which indicates the number of events to the server.

If the protocol for the feedback messages is to be RTCP instead of RTSP, it is possible to use RTCP APP packets (Application-defined RTCP packet, packet type 204), or the extensions of RTCP RR (receiver report, packet type 201) packets. Whatever the used packet is, it should contain at least a Metrics field, a Value field and, optionally, a Timestamp field. Metrics is the name of the metrics or the indication of an empty message (ASCII or number). Value is the result of the metrics (number). Timestamp is the time when the event occurred or the metrics was calculated (number), and it is provided only optionally. RTCP headers contain information on the particular media, so there is no need to repeat that information with extra fields.

In the feedback messages, the QoS-Feedback header contains only the updated QoS-Metrics metrics. If a metric parameter is not listed, but negotiated during setup phase, then that metric parameter is assumed to be unchanged/not-updated. The streaming client 30 can use the following message in any RTSP message after the PLAY request. Such a message is indicated in FIG. 4 as message 7. It is to be noted that the names of the parameters are just examples.

```
OPTIONS rtsp://example.com/foo/bar/baz.3gp RTSP/1.0
Cseq: 302
Session: 17903320
QoS-Feedback:
        url="rtsp://example.com/foo/bar/baz.3gp/trackID=3";
Framega
        p_max=100 6000; Framegap_ave=50 6000
        url= "rtsp://example.com/foo/bar/baz.3gp/trackID=5";
        AudioGap_ave =340.5 52;AudioGap_max=0 500
```

It is also possible to concatenate RTSP feedback messages in order to avoid a too high message sending rate, e.g. due to an event based sending.

Alternatively to an RTSP feedback message, the streaming client 30 can use for example the following RTCP RR message for reporting QoS data:

| RTCP header | | |
|---|---|---|
| Report block | | |
| Profile specific extension | | |
| AudioGap_ave | 105.5 | 6000 |
| AudioGap_max | 123 | 500 |

Further alternatively, the client can use for example the following RTCP APP message:

| RTCP APP header | | |
|---|---|---|
| Name | | |
| QoS_Metrics | | |
| Application-dependent data | | |
| Audiogap_ave | 105.5 | 6000 |
| Audiogap_max | 123 | 500 |

If measurements or events are being reported instead of calculated metrics, the event description may include more than one value. This might be of interest, for example, if during the reporting period there are two separate events where RTP packets are lost.

The following example for use in an RTSP message includes in addition the optional Timestamp information:

```
OPTIONS rtsp://example.com/foo/bar/baz.3gp RTSP/1.0
Cseq: 302
Session: 17903320
QoS-Feedback:
    url="rtsp://example.com/foo/bar/baz.3gp/trackID=3";Vcorruption_dur
    ={100 6000, 215.4 11000} ; Lost_RTP={3 6000, 5 11000}
    url= "rtsp://example.com/foo/bar/baz.3gp/trackID=5";
    Acorruption_dur={97 6000, 221 11000}
```

The following example for use in an RTCP RR message includes as well the optional Timestamp information:

| RTCP header | | |
|---|---|---|
| Report block | | |
| Profile specific extension | | |
| Acorruption_dur | 97 | 6000 |
| Acorruption_dur | 221 | 11000 |

The following example for use in an RTCP APP message includes as well the optional Timestamp information:

| RTCP APP header | | |
|---|---|---|
| Name | | |
| QoS_Metrics | | |
| Application-dependent data | | |
| Acorruption_dur | 97 | 6000 |
| Acorruption_dur | 221 | 11000 |

It is possible that either the streaming server 20 or the client 30 wants to change the negotiated parameters during a session. The server 20 might want for example some information more often, while the client 30 might notice that it cannot provide as many parameters as agreed upon. It is also possible to switch off the whole QoS metrics sending. In order to start it again later the streaming client 30 or the streaming server 20 can send a new request. During an ongoing streaming session, it is possible to use any RTSP message for re-negotiating the QOS metrics parameters. Any change of an initially negotiated reporting is subsumed as well under message 7 in FIG. 4.

The following is an example of a change request by the client 30 or the server 20 during a session, or restart request by the client 30 or the server 20 during a session after the QoS Metrics have been set off:

| | |
|---|---|
| C->S, S->C | OPTIONS rtsp://example.com/foo/bar/baz.3gp/trackID=5 RTSP/1.0<br>Cseq: 302<br>Session: 17903320<br>QoS-Metrics: metrics=AudioGap_ave,AudioGap_num, AudioGap_max;rate=20 |

A response to the change request indicating an acceptance of the request is defined for both directions for example as follows:

| | |
|---|---|
| S->C, C->S | RTSP/1.0 200 OK<br>Cseq: 302<br>Session: 17903320<br>QoS-Metrics: metrics=AudioGap_ave,AudioGap_num, AudioGap_max;rate=20 |

A response to the change request indicating a rejection of the request is defined for both directions for example as follows:

| | |
|---|---|
| S->C, S->C | RTSP/1.0 200 OK<br>Cseq: 302<br>Session: 17903320<br>QoS-Metrics:metrics=AudioGap_ave, AudioGap_max;rate=20 |

If the new values are not accepted, the previously used parameters are repeated indicating that the previously negotiated situation remains unchanged. The list of metrics is always absolute. There is no way to add or subtract the current list, but the new list of metrics replaces the old list.

The following is an example of a message by the client 30 or the server 20 during a session for setting the metrics off:

| | |
|---|---|
| C->S, S->C | OPTIONS rtsp://example.com/foo/bar/baz. 3gp RTSP/1.0<br>Cseq: 302<br>Session: 17903320<br>QoS-Metrics: Off |

It has to be noted that the metrics can be set off at session level or at media level. The url indicates what level is used. In the above example, the metrics are switched off at session level for all media.

If the request to set off the metrics is accepted, the response is defined for both directions for example as follows:

| | |
|---|---|
| S->C, C->S | RTSP/1.0 200 OK<br>Cseq: 302<br>Session: 17903320<br>QoS-Metrics: Off |

If the request to set off the metrics is rejected, the response is defined for both directions for example as follows:

| | |
|---|---|
| S->C, C->S | RTSP/1.0 200 OK<br>Cseq: 302<br>Session: 17903320<br>QoS-Metrics:metrics=AudioGap_ave, AudioGap_max;rate=20 |

That is, if the setting off is not accepted, the previously used parameters are repeated indicating that the previously negotiated situation remains unchanged. It is possible to re-negotiate the sending parameters if necessary.

The implementation of the streaming client 30 is easier, if only event detection is required.

It is an advantage of the presented method that messages can be sent periodically, and that messages are designed to be as small as possible.

The described method allows to convey more information that the above mentioned document on the 3GPP TSG-S4 Meeting #28. Further, the presented method makes the setup faster, since fewer messages are required. The proposed method also has the advantage that it allows to negotiate each one of the used metrics. It moreover provides the possibility to re-negotiate the metrics sending in the middle of a session, if necessary, and also to set the whole metrics sending off if necessary.

The presented method further provides a timestamp for metrics, which describes more accurately the time of the event than the range used in other solutions. An empty-message is defined for the case that there is no events to be described in a periodic message sending. It is also possible to concatenate several messages in order to optimize message sending.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of transmitting information relating to a quality of service, which information is to be transmitted in at least one direction between a first device and a second device, said method comprising at least at one of said devices:
   assembling a protocol message for use in a setup of a session between said first device and said second device, said protocol message containing information other than said information relating to a quality of service;
   attaching said information related to a quality of service to said protocol message, wherein said information relating to a quality of service is used in a quality of service negotiation; and
   transmitting said protocol. message to the respective other one of said first device and said second device during said setup of said session.

2. A method according to claim 1, wherein said protocol is one of a real-time streaming protocol message, a real-time transport control protocol and a session initiation protocol message.

3. A method according to claim 1 wherein said protocol message comprises a first protocol message, said information relating to a quality of service comprises first information relating to a quality of service, and the method further comprises:
 assembling a plurality of second protocol messages for transmission during said session, wherein a selected protocol message of said second plurality of protocol messages includes second information relating to a quality of service; and,
 transmitting the second plurality of protocol messges to the respective other one of said first device and said second device during said session.

4. A method according to claim 1, wherein said information relating to a quality of service comprises information on an achieved quality of service which is to be reported by said first device to said second device.

5. A method according to claim 4, wherein said informatiot on an achieved quality of service comprises information on at least one of an event, a measurement and a metric associated to an achieved quality of service.

6. A method according to claim 1, wherein after said setup of said session is performed, said at least one of said devices:
 assembling another protocol message containing information other than said information relating to a quality of service;
 attaching quality of service feedback information to said other protocol message; and transmitting said other protocol message to the respective other one of said first device and said second device.

7. A method according to claim 1, wherein said information relating to a quality of service comprises information for negotiating between said first device and said second device the extent to which said first device reports about an achieved quality of service to said second device.

8. A method according to claim 1, wherein said information relating to a quality of service comprises information indicating a frequency which is to be used by said first device for reporting an achieved quality of service to said second device.

9. A method according to claim 1, wherein said information relating to a quality of service is attached to at least one of a header of said protocol message and an attribute of said protocol message.

10. A non-transitory computer readable medium comprising software code stored thereon for running in a processing component of at least one of a first device and a second device for transmitting information relating to a quality of service, which information is to be transmitted in at least one direction between said first device and said second device, said software code realizing, the following functions:
 assembling a protocol message for use in a setup of a session between said first device and said second device, said protocol message containing information other than said information relating to a quality of service; and
 attaching said information relating to a quality of service to said protocol message, wherein said information relating to a quality of service is used in a quality of service negotiation during, said setup of said session.

11. A device comprising:
 at least one processor and at least one memory including software code the at least one memory and the software code configured to, with the at least one processor, cause the device at least to:
 assemble a protocol message for use in a setup of a session, said protocol message containing information other than information relating to a quality of service, and attach information relating to a quality of service to said protocol message, wherein said information is used in a quality of service negotiation with another device; and,
 transmit said assembled protocol message to said other device during said setup of said session.

12. A network element of a network comprising:
 at least one processor and
 the at least one memory and the software code configured to, with the at least one processor, cause the device at least to:
 assemble a protocol message for use in a setup of a session, said protocol message containing information other than information relating to a quality of service;
 attach information relating to a quality of service to said message, wherein said information relating to a quality of service is used in a quality of service negotiation with a device accessing said network; and
 transmit a protocol message assembled by said assembling, component to said device during said setup of said session.

13. A device comprising:
 at least one processor and
 at least one memory including software code
 the at least one memory and the software code configured to, with the at least one processor, cause the device at least to:
 assemble a protocol message for use in a setup of a session, said protocol message containing information other than information relating to a quality of service, and attach information relating to a quality of service to said message, wherein said information relating to a quality of service is used in a quality of service negotiation during said setup of said session with another device.

14. A method of transmitting information relating to a quality of service, which information is to be transmitted in at least one direction between a first device and a second device, said method comprising at least at one of said devices:
 assembling a protocol message for use in a setup of a session between said first device and said second device, said protocol message containing information other than said information relating, to a quality of service
 forming said information relating to a quality of service inside at least one of a header field and an attribute of said protocol message, wherein said information is used in a quality of service negotiation; and,
 transmitting said protocol message to the respective other one of said-first device and said second device during said setup of said session.

15. A method according to claim 14, wherein said protocol message is one of a real-time streaming protocol message, a real-time transport control protocol, a session initiation protocol message and a session description protocol description.

16. A method according to claim 14, wherein said information of relating to a quality of service comprises information on an achieved quality of service which is to be reported by said first device to said second device.

17. A method according to claim 16, wherein said information relating to a quality of service comprises information on at least one of an event, a measurement and a metric associated to an achieved quality of service.

18. A method according to claim 14, wherein after said session is formed, said at least one of said devices:
assembling another protocol message containing information other than said information relating to a quality of service;
attaching quality of service feedback information to said other protocol message; and,
transmitting said other protocol message to the respective other one of said first device and said second device.

19. A method according to claim 14, wherein said information relating to a quality of service comprises information for negotiating between said first device and said second device the extent to which said first device reports about an achieved quality of service to said second device.

20. A method according to claim 14, wherein said information relating to a quality of service comprises information indicating a frequency which is to be used by said first device for reporting an achieved quality of service to said second device.

21. A non-transitory computer readable medium comprising:
software code stored thereon for running in a processing component of a device for causing the device to transmit information relating to a quality of service, which information is to be transmitted in at least one direction between said device comprising one of a first device and a second device, said software code realizing the following function when running in said processing component of said device:
assembling a protocol message for use in a setup of a session with another device, the protocol message containing information other than said information relating to a quality of service
forming said information relating to a quality of service inside at least one of a header field and an attribute of the protocol message, wherein said information is used in a quality of service negotiation with the other device during said setup of said session.

22. A device comprising: at least one processor and
at least one memory including software code
the at least one memory and the software code configured to, with the at least one processor, cause the device at least to:
assemble a protocol message for use in a setup of a session with another device, the protocol message containing information other than said information relating to a quality of service;
assemble information relating to a quality of service inside at least one of a header field and an attribute of the protocol message, wherein the information relating, to a quality of service is used in a quality of service negotiation; and
transmit said protocol message to said other device during said setup of said session.

23. A network element of a network comprising:
a first assembling component for forming a protocol message for use in a setup of session with another device, the protocol message containing information other than information relating to a quality of service;
a second assembling component for forming information relating to a quality of service inside at least one of a header field and an attribute of the protocol message, wherein the information is used in a quality of service negotiation; and
a transmitting component for transmitting the protocol message provided by said second assembling component to said other device during said setup of said session.

24. A device for transmitting information relating to a quality of service, which information is to be transmitted in at least one direction between a first device and a second device, at least at one of said devices comprising:
means for assembling a protocol message for use in a setup of a session, the first protocol message containing information other than said information relating to a quality of service;
means for attaching information relating to a quality of service to the protocol message, wherein information is used in a quality of service negotiation; and
means for transmitting said protocol message to the respective other one of said first device and said second device during said setup of said session.

25. A device for transmitting information relating to a quality of service, which information is to be transmitted in at least one direction between a first device and a second device, at least at one of said devices comprising:
means for forming a protocol message used in a setup of a session, the protocol message containing information other than information relating to a quality of service;
means for forming said information relating to a quality of service inside at least one of a header field and an attribute of the protocol message, wherein the information relating to a quality of service is used in a quality of service negotiation; and
means for transmitting said protocol message to the respective other one of said first device and said second device during said setup of said session.

26. A device comprising:
means for assembling a protocol message for use in a setup of a session, the protocol message containing information other than information relating to a quality of service, and for attaching information relating to a quality of service to said protocol message, wherein the information relating to a quality of service is used in a negotiation of quality of service with another device; and
means for transmitting the protocol message assembled by said assembling component to said other device during said setup of said session.

27. A device comprising:
means for forming a protocol message used in a setup of a session, the protocol message containing information other than information relating to a quality of service;
means for forming information relating to a quality of service inside at least one of a header field and an attribute of the protocol message, wherein the information relating to a quality of service is used in a quality of service negotiation with another device:, and
means for transmitting the protocol message to said other device during said setup of said session.

28. A method of transmitting information relating to a quality of service experience by at least one of a first device and a second device in a wireless network, which information is to be transmitted in at least one direction between said first device and said second device, said method comprising at least at one of said devices:
assembling a protocol message for use in a setup of a session, the first protocol message containing information other than information relating to a quality of service experience by at least one of said first device and said second device;

attaching said information relating to a quality of service experience by at least one of said first device and said second device to said protocol message, wherein said information relating to a quality of service is used in a negotiation of quality of service; and transmitting said protocol message to the respective other one of said first device and said second device over said wireless network during said setup of said session.

* * * * *